United States Patent [19]

Olgren

[11] Patent Number: 4,832,524
[45] Date of Patent: May 23, 1989

[54] PLUG-IN, QUARTER TURN ATTACHMENT ASSEMBLY

[75] Inventor: Leland N. Olgren, Frankenmuth, Mich.

[73] Assignee: General Motors Corporation, Detroit, Mich.

[21] Appl. No.: 179,693

[22] Filed: Apr. 11, 1988

[51] Int. Cl.$^4$ ............................................. B25G 3/00
[52] U.S. Cl. .................................. 403/348; 285/360; 74/493
[58] Field of Search .............. 403/348, 349; 285/360, 285/361; 74/493

[56] References Cited

U.S. PATENT DOCUMENTS 3,171,666 3/1965 Benjamin et al. .............. 403/348 X
4,543,848 10/1985 Beauch ................................ 74/493

FOREIGN PATENT DOCUMENTS 642567 1/1979 U.S.S.R. .............................. 285/361

Primary Examiner—Andrew V. Kundrat
Attorney, Agent, or Firm—Charles R. White

[57] ABSTRACT

A plug-in, quarter turn attachment assembly includes a first element with a D-shaped male plug portion insertable into a corresponding D-shaped aperture in a second element, the male plug portion having a grooved cammed surface of an axial extent such that when the first element is rotated a quarter turn relative to the second element, these elements are axially secured together and are releasably retained by a compression spring that is supported on the male plug portion for rotation therewith and is provided with raised beads engageable in corresponding grooves provided for this purpose on the second element.

1 Claim, 1 Drawing Sheet

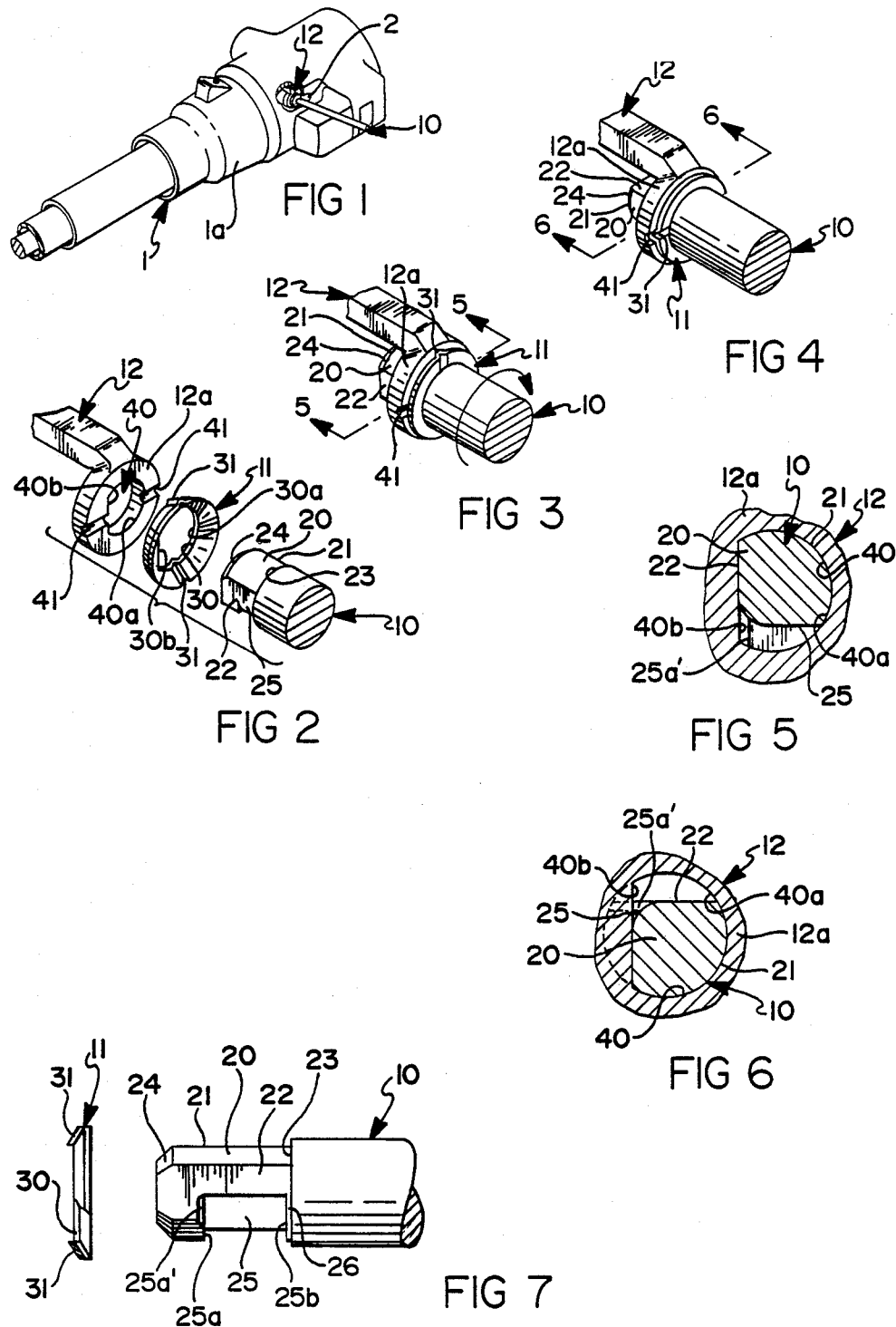

PLUG-IN, QUARTER TURN ATTACHMENT ASSEMBLY

This invention relates to a fastener assembly and, in particular, to an assembly wherein a rod with a D-shaped plug end is releasably secured by a quarter turn to an element having a D-shaped aperture therein.

DESCRIPTION OF THE PRIOR ART

In certain mechanical mechanisms, it is desirable to releasably secure one end of a rod by mechanical means to another element of the mechanism. Thus by way of an example only, in a tilt steering column for a vehicle of the type shown, for example, in U.S. Pat. No. 4,543,848 issued Oct. 1, 1986 to Howard D. Beauch, an externally, operator actuated, tilt lever rod has one end thereof fixed to the bent arm of an actuator or shoe release lever that is located in the steering column and which is operatively connected to a locking shoe used to control the tilt position of the upper end of the steering column.

In a simple construction, one end of the tilt lever rod is provided with external threads for mating engagement with an internally threaded aperture in the bent arm of the shoe release lever. In an alternate attachment structure, the bent arm of the shoe release lever is provided with a suitable aperture and associate spring biased detent located so as to engage into an annular groove provided in the inboard end of a tilt lever rod as the latter is inserted into the aperture whereby to effect axial retention of the tilt lever rod. This latter fastener device is relatively expensive to manufacture.

SUMMARY OF THE INVENTION

The present invention relates to an attachment assembly wherein a first element such as a tilt lever rod is provided at one end with a reduced diameter D-shaped plug end that, intermediate its ends, is provided on one side thereof with a grooved cammed surface, a second element, of predetermined thickness relative to the axial extend of the grooved cammed surface being provided witha complementary D-shaped aperture, whereby the D-shaped plug can be inserted therein and then rotated a quarter turn to effect attachment of the rod to the second element. A compression washer with a corresponding D-shaped aperture therein and provided with raised beads is fixed onto the D-shaped plug of the rod outboard of the second element so that upon completion of the quarter turn of the rod, the raised beads engage into corresponding grooves provided on the outboard surface of the second element so as to lock the tilt lever rod in the quarter turned position.

It is therefore a primary object of this invention to provide an improved attachment assembly that includes a first element such as a rod with a male plug portion at one end formed in a D-shape that contains a cammed surface located a controlled distance from the free end of the male plug portion; a second element defining a female portion with a complementary D-shaped aperture therethrough to accommodate the male portion, the outboard surface of the second element contains two recesses or grooves located adjacent to the D-shaped aperture and at a right angle to the flat of the D so as to receive the raised portions of a compression washer, operatively fixed to the D-shaped plug prior to its insertion into the D-shaped aperture, so that upon insertion of the D-shaped plug portion into the aperture in the second element, and then a quarter turn of the first element relative to the second element, these elements are releasably secured together.

For a better understanding of the invention as well as other objects and further features thereof, reference is had to the following detailed description of the invention to be read in connection with the accompanying drawings.

BRIEF DESCRIPTION OF THE DRAWINGS

FIG. 1 is a perspective view of a vehicle steering column of the tilt type, with a part thereof broken away to show at least the attachment assembly of a tilt lever rod to the bent arm of a shoe release lever in accordance with the invention;

FIG. 2 is an exploded view of the plug-in, quarter turn attachment assembly, per se, of FIG. 1;

FIG. 3 is a view of the elements of FIG. 2 as originally assembled together in the orientation shown in FIG. 2;

FIG. 4 is a view of the part assembled elements of FIG. 3, but with the tilt lever rod and compression spring rotated clockwise a quarter turn from their positions shown in FIG. 3 to the final assembled position;

FIG. 5 is a cross-sectional view taken along line 5—5 of FIG. 3;

FIG. 6 is a cross-sectional view taken along line 6—6 of FIG, 4; and,

FIG. 7 is an exploded side elevational view of the tilt lever rod and compression washer, per se, of FIG. 2.

DESCRIPTION OF THE PREFERRED EMBODIMENT

Although the plug-in, quarter turn attachment assembly of the subject invention can be used in numerous mechanisms, for the purpose of description only, the subject invention will be described as a means for releasably securing a tilt lever rod to the shoe release lever in a vehicle tilt steering column of the type disclosed in the above-identified U.S. Pat. No. 4,543,848.

Accordingly there is shown in FIG. 1 a portion of a conventional type tilt steering column 1 which, adjacent to its upper end, is provided with an elongated opening 2 in the lower outer housing 1a thereof so as to loosely receive a tilt lever rod 10 which at its inboard end is operatively connected to a shoe release lever 12 in a manner to be described hereinafter. As well known, a vehicle operator can actuate the tilt lever arm so as to permit the operator to tilt the upper or right hand end of the steering column relative to the lower or left hand end portion of the steering column, with reference to FIG. 1.

Referring now to the plug-in, quarter turn attachment assembly of the invention for use in a tilt steering column as described above, this assembly includes, in succession from right to left with reference to FIG. 2, a first element in the form of a tilt lever rod 10, a compression washer 11 and a second element such as a lever and, in particular, a shoe release lever 12.

The first element or tilt lever rod 10, only one end of which is shown in the drawings, has a main body portion and is provided at one end thereof, the left end as best seen in FIGS. 2 and 7, with a male plug portion 20 of generally D-shape configuration as defined by a portion with a semi-circular outer peripheral surface 21 of an effective external diameter less than the nominal external diameter of the adjacent portion of the main body of the tilt lever rod 10 normally of round configuration, and a flat chord portion or surface 22. These exterior surfaces of the male plug portion 20 are connected to the outer peripheral surface of the main body portion of the tilt lever rod 10 by a flat radial shoulder 23 which serves as an abutment surface for an outboard surface portion of the compression washer 11 to be described hereinafter. Preferably, as shown in FIG. 7, the inboard free end of the male plug portion 20 is suitably chamfered as at 24.

As best seen in FIGS. 5-7, the male plug portion 20 is provided with a recessed or grooved cammed surface 25 located a predetermined distance from the free end of the plug portion and also from the shoulder 23, the recessed or grooved cammed surface 25 being of a predetermined axial extent so as to define inboard and outboard abutment surfaces 25a and 25b, respectively, for a purpose to be described. The recessed or grooved cammed surface 25 and, in particular the outboard abutment surface 25b, as thus located leaves a D-shaped, washer receiving land 26 adjacent to shoulder 23, as best seen in FIG. 7, for supporting the compression washer 11 to be described next hereinafter. Also as best seen in FIG. 7, the leading edge of the inboard surface 25a is provided with an inclined lead-in cam surface 25a'.

The compression washer 11, in the preferred embodiment, is in the form of a thin belleville type spring washer, with the aperture 30 therethrough being of a D-shape, formed and sized to conform to the D-shaped male plug portion 20 of the tilt lever rod 10. Thus as best seen in FIG. 2, the aperture 30 is defined by a semi-circular surface portion 30a and an interconnecting flat surface portion 30b. The inboard or left hand, with reference to FIG. 7, surface of the washer 11 is provided, as by a stamping process, with radial extending raised beads 31, one on each side of the aperture 30 and radially aligned parallel to the flat surface portion 30b and the nominal center of the compression washer 11. With this arrangement, the compression washer 11 can be assembled over the end of the male plug portion 20 and then axially positioned so as to be supported on the land 26 and against shoulder 23, where by substantially no relative rotation can occur between the compression washer 11 and the tilt lever rod 10 during the latter's assembly to the shoe release lever 12.

Referring now to the second element which is in the form of a shoe release lever 12, only a portion of which is shown in FIGS. 1-4, that is provided at one end thereof, in the construction shown, with a bent arm portion 12a of a predetermined thickness relative to the axial extent of the grooved cam surface 25. This bent arm portion 12a can be of any suitable configuration, as desired, as long as its external dimension(s) are substantially greater than the external diameter of the compression washer 11 when the latter is fully compressed. Thus in the embodiment shown, the free end of the bent arm portion 12a is of circular configuration with an external diameter substantially greater than the outside diameter of the compression washer 11. It should be appreciated by those skilled in the art that the second element could be of any suitable configuration as long as it could be provided with a D-shaped aperture therethrough as described next hereinafter.

The female portion in the second element of the attachment assembly consists of a through D-shaped aperture 40 formed in the bent arm portion 12a which is shaped and sized so as to slidably receive the plug portion 20 of the lever rod 10 and thus this aperture 40 includes an internal semi-circular surface portion 40a and an internal chord surface portion 40b, as best seen in FIGS. 2, 5 and 6.

The outboard free end surface of the bent arm portion 12a is provided with a pair of grooves or recesses 41, one on each side of the aperture 40 and these grooves or recesses 41 are aligned at a right angle to the chord surface portion 40b and also with the nominal central axis of the aperture 40. The grooves or recesses 41 are configured to conform to the shape and size of the beads 31 on the compression washer 11 so that these beads 31 and recesses 41 can operate as a lock detent arrangement when interlocked as shown in FIG. 4 while still permitting cam out of the beads 31 from the associate recesses 41 under a predetermined load so as to permit disassembly, if desired, for purpose of repair, as of the tilt steering column 1 in the particular application of the invention shown.

Now as best seen in FIGS. 5 and 6, the grooved cammed surface 25 is formed on one side of the D-shaped plug portion 20, the left hand side with reference to FIG. 6 in the construction shown. With this arrangement, after the elements are assembled as shown in FIGS. 3 and 5, the tilt lever rod 10 can then be rotated in a clockwise direction, as seen in FIG. 3, a quarter turn, that is, 90° to effect the locked attachment assembly as shown in FIGS. 4 and 6, a position at which the abutment surface 25a overlaps the material on the back of the bent arm portion adjacent to the chord portion 40b, as shown in FIG. 6, whereby to prevent outward movement or disengagement of the tilt lever rod 10 relative to the bent arm portion 12a of the shoe release lever 12.

It should be appreciated that if desired, the grooved cammed surface 25 can be formed on the opposite side of the D-shaped plug portion 20 from the position shown, in which case, after assembly of the elements as shown in FIG. 3, the tilt lever rod 10 would then have to be rotated a quarter turn in a counterclockwise direction relative to the shoe release lever 12 to effect the locked attachment assembly of the tilt lever rod 10 to the shoe release lever 12.

The disassembly of the subject attachment assembly is the exact reverse of the assembly process described hereinabove. In a particular tilt lever rod 10 to a shoe release lever 12 attachment, the grooved cammed surface 25 was sized relative to the thickness of the bent arm portion 12a of the shoe release lever 12 and the bias force of the compression spring 11 was preselected for a particular tilt steering column application, such that a rotative force of approximately 9 inch-pounds on the tilt lever rod 10 relative to the shoe release lever 12 was required to effect disassembly.

While the invention has been described with reference to the structures disclosed herein, it is not confined to the details set forth and thus this application is intended to cover such modifications or changes as may come within the purposes of the improvement or the scope of the following claims.

The embodiments of the invention in which an exclusive property or privilege is claimed are defined as follows:

1. A plug-in, quarter turn attachment assembly includes a first element, a compression washer and a second element, said first element in the form of a rod having a main body portion with a reduced male plug portion of D-shaped configuration at one end thereof, said male plug portion having a grooved cammed surface of a predetermined axial extent located intermediate its ends and located so as to define a D-shaped washer receiving land next adjacent to said main body portion and interconnected thereto by a radial shoulder, said compression washer having a D-shaped aperture and is operatively supported on said washer receiving land in abutment against said radial shoulder, said second element having a portion of a predetermined thickness relative to the axial extent of said grooved cammed surface, said portion having a D-shaped aperture therethrough of a size and configuration such that said male plug portion extends therethrough whereby with a rotative quarter turn of said first element relative to said second element said first element is axially fixed relative to said second element, said compression washer and said second element having opposed raised beads and grooves, respectively, positioned so as to cooperate with each other whereby to releasably lock said first element to said second element after said rotative quarter turn.

* * * * *